United States Patent
Saito et al.

(10) Patent No.: US 8,781,247 B2
(45) Date of Patent: Jul. 15, 2014

(54) ADDING NEW TEXTURE TO AN IMAGE BY ASSIGNING PIXEL VALUES OF SIMILAR PIXELS AND OBTAINING A SYNTHETIC IMAGE

(75) Inventors: Kanako Saito, Inagi (JP); Yasunori Taguchi, Kawasaki (JP); Takashi Ida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 662 days.

(21) Appl. No.: 12/558,253

(22) Filed: Sep. 11, 2009

(65) Prior Publication Data

US 2010/0226577 A1 Sep. 9, 2010

(30) Foreign Application Priority Data

Mar. 6, 2009 (JP) ................................. 2009-053900

(51) Int. Cl.
*G06K 9/40* (2006.01)

(52) U.S. Cl.
USPC .......................................................... 382/274

(58) Field of Classification Search
None
See application file for complete search history.

(56) References Cited

U.S. PATENT DOCUMENTS

| | | | | |
|---|---|---|---|---|
| 5,369,736 A * | 11/1994 | Kato et al. | ..................... | 345/582 |
| 5,649,173 A * | 7/1997 | Lentz | ........................... | 345/501 |
| 6,792,205 B2 * | 9/2004 | Frisken et al. | ................. | 396/138 |
| 6,996,287 B1 * | 2/2006 | Weiss | ............................ | 382/260 |
| 7,199,793 B2 * | 4/2007 | Oh et al. | ....................... | 345/419 |
| 2004/0218838 A1 * | 11/2004 | Tojo et al. | ..................... | 382/305 |

OTHER PUBLICATIONS

Chen et al. Experiments on block-matching techniques for video coding, 1994, Springer-Verlag, pp. 228-240.*

Wei et al.; "Fast Texture Synthesis Using Tree-Structured Vector Quantization", Proc. SIGGRAPH, 2000, pp. 479-488, (2000).

* cited by examiner

*Primary Examiner* — Jason M Repko
*Assistant Examiner* — Jhere Rowland
(74) *Attorney, Agent, or Firm* — Finnegan, Henderson, Farabow, Garrett & Dunner, LLP (57) ABSTRACT

An apparatus includes, a unit generating a sample-texture image, a unit searching a preset-search range for similar pixels and to generate a texture image by assigning a pixel value of each of the similar pixels to a pixel value of a processing-target pixel in the texture image, the preset-search range being included in the sample-texture image and including a position corresponding to a position of the processing-target pixel to which any pixel value is not yet assigned, the similar pixels having, around the similar pixels, variation patterns similar to a pattern of pixels which are located in the texture image near the processing-target pixel and to which pixel values are assigned, and a unit combining the texture image and a base image of a same size as the texture image to obtain a synthetic image, the base image holding shades similar to shades of a transform-target image.

11 Claims, 12 Drawing Sheets

ADDING NEW TEXTURE TO AN IMAGE BY ASSIGNING PIXEL VALUES OF SIMILAR PIXELS AND OBTAINING A SYNTHETIC IMAGE

CROSS-REFERENCE TO RELATED APPLICATIONS

This application is based upon and claims the benefit of priority from prior Japanese Patent Application No. 2009-053900, filed Mar. 6, 2009, the entire contents of which are incorporated herein by reference.

BACKGROUND OF THE INVENTION

1. Field of the Invention

The present invention relates to an image processing apparatus and method for adding a new texture to an image.

2. Description of the Related Art

TV Digital broadcasting has recently started, and the resolution and image quality have been enhanced compared to the analog broadcasting so far. To further enhance the image quality, expression of a texture is important. If a texture component as a design/pattern component is degraded or disappeared in an image, the feel of a material will inevitably be reduced. In such a case, the feel of the material can be enhanced by adding a high-frequency texture component.

Li-Yi Wei, Marc Levoy, "Fast Texture Synthesis using Tree-structured Vector Quantization," Proc. SIGGRAPH, 2000, pp. 479-488, 2000, for example, has proposed a technique of generating a seamless texture image of an arbitrary size from a sample texture of a small size. The thus generated texture image is perceived as if patterns similar to the sample texture were connected seamlessly.

The above technique, however, cannot generate an image with a new texture component added thereto, in which shades and/or the orientations of textures contained in an original image as a conversion target are unchanged.

BRIEF SUMMARY OF THE INVENTION

According to an aspect of the invention, there is provided an image processing apparatus comprising: an image generating unit configured to generate a sample texture image by extracting a texture component from a transform target image; a searching unit configured to search a preset search range for similar pixels and to generate a texture image which is greater than the sample texture image by assigning a pixel value of each of the similar pixels to a pixel value of a processing target pixel in the texture image, the preset search range being included in the sample texture image and including a first position corresponding to a second position of the processing target pixel to which any pixel value is not yet assigned, the similar pixels having, around the similar pixels, pixel value variation patterns similar to a pixel value pattern of pixels which are located in the texture image near the processing target pixel and to which pixel values are already assigned; and a combining unit configured to combine the texture image and a base image of a same size as the texture image to obtain a synthetic image, the base image holding shades similar to shades of the transform target image.

DETAILED DESCRIPTION OF THE INVENTION

Embodiments of the invention will be described with reference to the accompanying drawings. In the embodiments, like reference numbers denote like elements, and duplication of description will be avoided. Each image employed in the embodiments is a digital image that has at least one pixel value per each pixel. In each embodiment below, a description will be given of the case where a luminance value as one pixel value is used for processing. It is a matter of course that another pixel value (such as a color difference component value or each component value of an R, G and B format) may be used for the following processing.

The embodiments provide an image processing apparatus capable of maintaining shades and/or the orientations of textures contained in an original image as a conversion target, and generating an image with a new texture component added thereto, and also to provide an image processing method employed in the apparatus.

The present embodiments can generate an image with a texture component added thereto, the texture component holding the shades contained in an image as a transform target, and the orientations of the textures contained in the image.

First Embodiment

Figure 1:
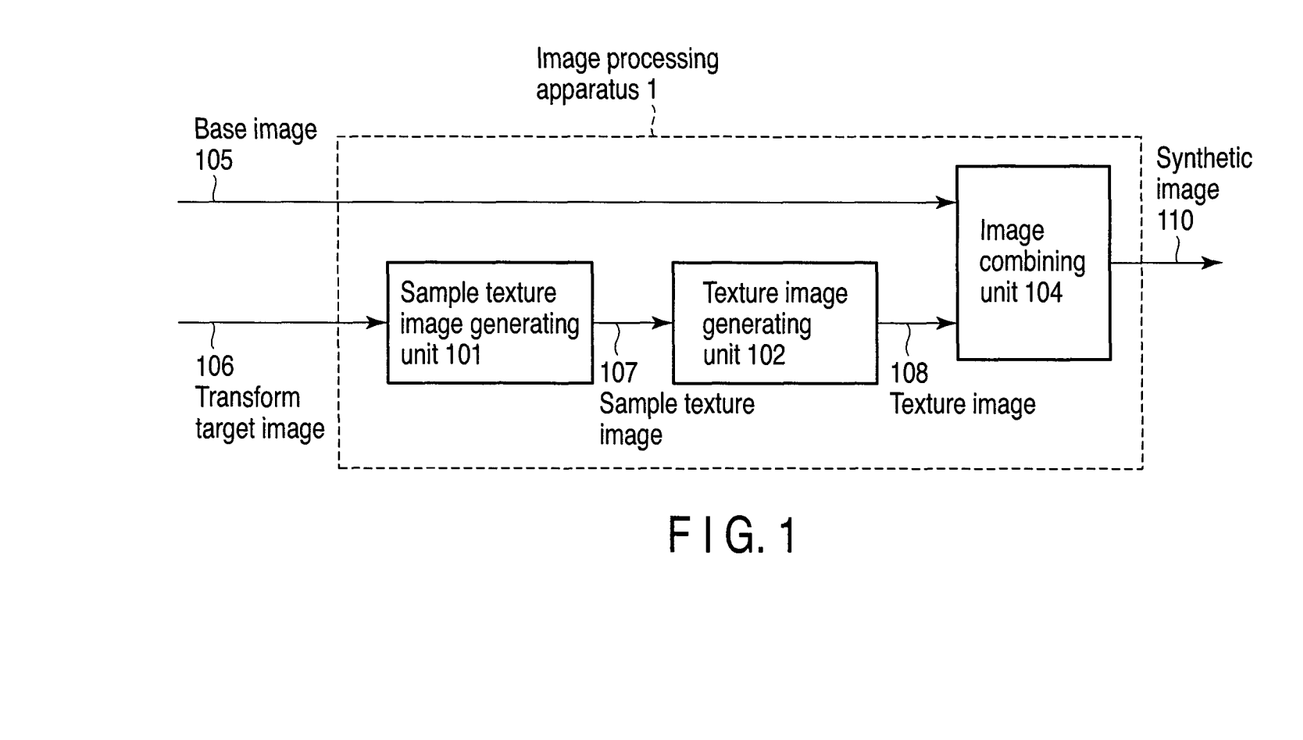
FIG. 1 is a block diagram illustrating an image processing apparatus according to a first embodiment.

FIG. 1 shows an image processing apparatus 1 according to a first embodiment. The image processing apparatus 1 comprises a sample texture image generating unit 101, a texture image generating unit 102 and an image combining unit 104.

The image processing apparatus 1 generates and outputs a synthetic image 110 as an image with a high-frequency texture component added thereto, using an input base image 105 and a transform target image 106. The synthetic image 110 to be output has a size greater than the transform target image 106. The base image 105 has the same size as the synthetic image 110, and has shades as a gradual variation pattern of luminance values included in the transform target image 106. It is sufficient if the base image 105 is an image that holds shades contained in the transform target image 106. For instance, the base image 105 may be an image obtained by expanding the transform target image 106 itself, or an image (non-texture image) having an image component that expresses rough variations in the luminance values of the expanded image.

The transform target image 106 is firstly sent to the sample texture image generating unit 101. The sample texture image generating unit 101 eliminates, from the transform target image 106, shades as an image component indicating a gradually varied pattern of luminance values to extract therefrom a texture component, thereby generating a sample texture image 107. The transform target image 106 and the sample texture image 107 are of the same size.

The texture image generating unit 102 generates, from the sample texture image 107, a texture image 108 having the same size as a synthetic output image 110. A method of generating the texture image 108 will be described later.

The image combining unit 104 combines the input base image 105 with the texture image 108 generated by the texture image generating unit 102.

The operation of the image processing apparatus 1 will now be described in detail.

Figure 2:
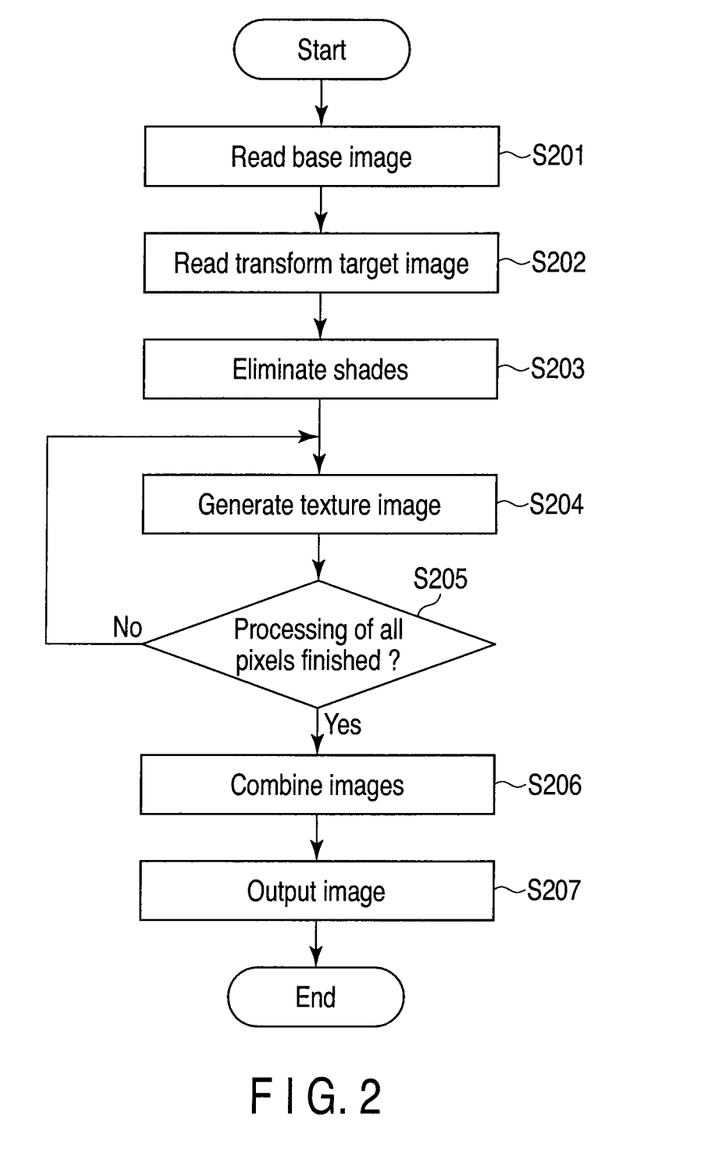
FIG. 2 is a flowchart useful in explaining the operation of the image processing apparatus of the first embodiment.

FIG. 2 is a flowchart useful in explaining the operation of the image processing apparatus 1.

At step S201, the input base image 105 is read in. For instance, the base image 105 may be an image obtained by enlarging the transform target image 106, or an image (non-texture image) having an image component that expresses rough variations in the luminance values of the image obtained by enlarging the transform target image 106. In the image processing apparatus 1 of the first embodiment, it is sufficient if the beforehand generated base image 105 is input. For example, the skeleton/texture separation method, the Center/Surround Retinex method or the ε-filter is used to generate the base image 105 that is obtained by eliminating a texture component from the enlarged image (i.e., the enlarged transform target image 106).

Figure 3:
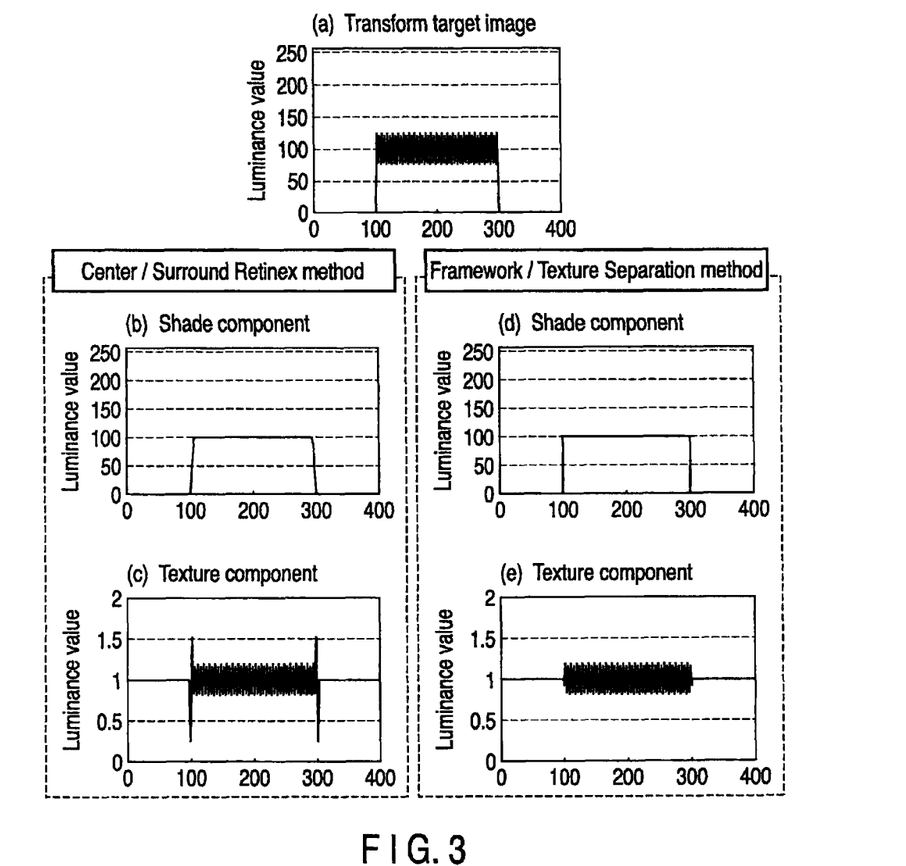
FIG. 3 is a view useful in explaining a method of separating an image into shades and textures.

FIG. 3 is a view useful in explaining a method of separating an image into a shade component and a texture component, and shows cases where the image is observed one-dimensionally. The horizontal axis indicates the one-dimensional position, and the vertical axis indicates the luminance. (a) of FIG. 3 shows an image example obtained before separation. (b) and (c) of FIG. 3 show image examples obtained by separating the image shown in (a) of FIG. 3 using the Center/Surround Retinex method. When the Center/Surround Retinex method is used, an edge component of a great luminance difference is conserved in the texture component. (b) of FIG. 3 shows the separated shade component, and (c) of FIG. 3 shows the separated texture component. (e) and (d) of FIG. 3 show image examples obtained by separating the image shown in (a) of FIG. 3 using the skeleton/texture separation method. When the skeleton/texture separation method is used, an edge component of a high intensity is conserved in the shade component. In any case, a texture component in which a rough luminance variation pattern of the image shown in (a) of FIG. 3 is eliminated can be obtained.

The skeleton/texture separation method will be described briefly using mathematical expressions. The skeleton/texture separation method is used to separate an input image I into a skeleton component (corresponding to a non-texture component U) indicating a rough structure of a subject, and a texture component (corresponding to a texture component V) indicating a fine surface vibration of the subject. This method includes:

an additive separation-model given by $$I(x,y) \approx U(x,y) + V(x,y) \quad (1)$$

and
a multiplicative separation-model given by $$I(x,y) \approx U(x,y) \times V(x,y) \quad (2)$$

where x and y indicate the x-coordinate and the y-coordinate, respectively.

A description will now be given only of the multiplicative separation-model.

This scheme can be treated as a minimization problem given by the following expression (3):

$$\inf_{u \in X, v \in G_\mu} \left( J(u) + \frac{1}{2\gamma} \|f - u - v\|_{L_2}^2 \right), \quad (3)$$

$$G_\mu = \{v \in G | \|v\|_G \le \mu\},$$

$$\gamma > 0,$$

$$\mu > 0$$

where f is an input image logarithmic function obtained by executing logarithmic conversion on the input image I, u and v are a logarithmic skeleton function and a logarithmic texture function obtained by executing logarithmic conversion on the skeleton function U and the texture component V, respectively, μ is a parameter for adjusting the upper limit of the norm of the logarithmic texture function v, and γ is a parameter for adjusting the allowable range of a residual error of f−u−v. Further, J(u) is total variation energy defined by the following equation (4), and X and G are an image function space, and an oscillation function space close to the dual space of a bounded variation function space, respectively:

$$J(u) = \int \|\Delta u\| dx dy \quad (4)$$

The energy minimization problem given by the above expression (3) is solved by the following projection algorithm.

[Projection Algorithm]
(1) Initialization:

$$u^{(0)} = v^{(0)} = 0 \quad (5)$$

(2) Iterations:

$$v^{(n+1)} = P_{G_\mu}(f - u^{(n)}) \quad (6)$$

$$u^{(n+1)} = f - v^{(n+1)} - P_{G_\gamma}(f - v^{(n+1)}) \quad (7)$$

where $P_{Gx}(f)$ is an orthogonal projection of the function f onto subspace $G_\gamma$.

(3) Convergence Test:

if $\max(|u^{(n+1)} - u^{(n)}|, |v^{(n+1)} - v^{(n)}|) \le \epsilon$, then stop the iteration. (8)

Lastly, u and v obtained by the projection algorithm are subjected to exponential transform to thereby obtain the skeleton component U and the texture component V.

$$U(x,y) = \exp(u(x,y)) \quad (9)$$

$$V(x,y) = \exp(v(x,y)) \quad (10)$$

The Center/Surround Retinex method will be described briefly using certain mathematical expressions. The Center/Surround Retinex method is used to separate the input image I into an illumination component (corresponding to the non-texture component U) and a reflection component (corresponding to the texture component V).

Input Image $I$ = Illumination Component $U$ × Reflection component $V$ (11)

Firstly, the illumination component U is estimated using the equation (12).

$$U_i(x,y)=G_M(x,y)*I_i(x,y), i \in (R,G,B) \quad (12)$$

where $G_M(x, y)$ is a Gausian filter having a filter size of M×M, and * indicates convolutional integration. The Gausian filter $G_M(x, y)$ is given by $$G_M(x,y)=K\exp(-(x^2+y^2)/2\sigma^2) \quad (13)$$

where K is a value that satisfies the following equation:

$$\iint G(x,y)dxdy=1$$

Further, σ in the equation (13) is a standard deviation.

Subsequently, the reflection component V is estimated based on the input image I and the illumination component U, using the following equation (14):

$$V_i(x, y) = \frac{I_i(x, y)}{U_i(x, y)}, \quad (14)$$
$$i \in (R, G, B)$$

At step S202, the transform target image 106 is read in.

At step S203, shades are removed from the transform target image 106 to thereby generate the sample texture image 107, and the program proceeds to step S204. This removal may be performed using, for example, the skeleton/texture separation method or the Center/Surround Retinex method. If the normal direction and the illumination condition are constant in a local region of the image, an invariant with respect to a diffuse reflection component can be obtained in the local region. In FIG. 3, the texture component corresponds to the sample texture image 107. The sample texture image 107 has the same size as the transform target image 106.

At step S204, the texture image 108 is generated from the sample texture image 107. Each region of the texture image 108 is generated by detecting a pattern similar to that of said each region in a region of the sample texture image 107 corresponding to said each region. Specifically, (a) processing target pixels, which are included in the texture image 108 and the pixel values of which are not yet determined, are sequentially selected. (b) A small region including a position on the sample texture image 107 corresponding to the position of each selected processing target pixel on the texture image 108 is set as a search range. (c) The pixel value of each of the pixels (similar pixels) in the search range, which exhibit a pixel-value variation pattern similar to an already determined pixel-value pattern of those pixels on the texture image 108 which include said each selected processing target pixel, is assigned to said each selected processing target pixel. By iterating this processing, the texture image 108 is generated.

Figure 4:
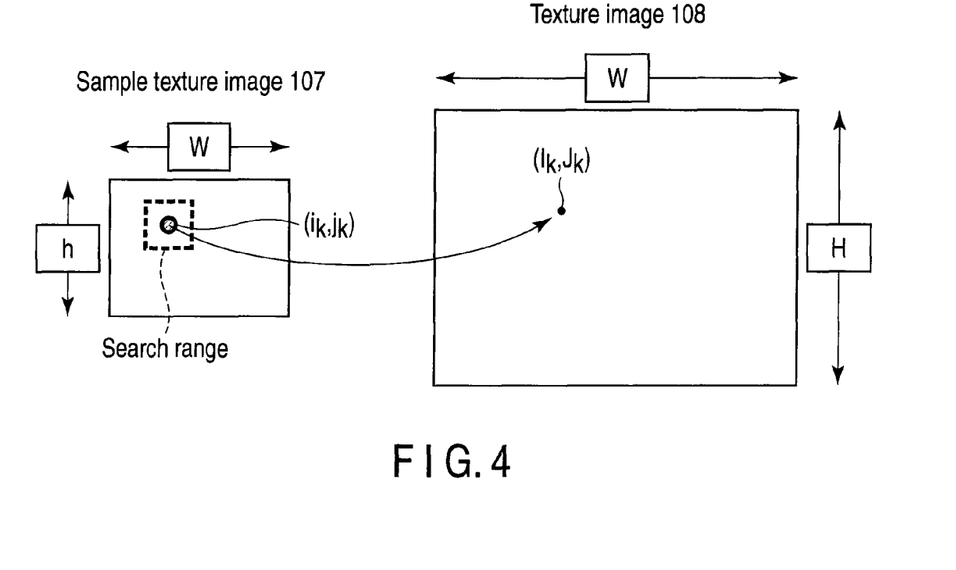
FIG. 4 is a view illustrating the outline of a generated sample texture image.

FIG. 4 is a view useful in explaining the sample texture image 107 and the texture image 108. Assuming that the size of the sample texture image 107 is w×h [pixels], the size of the texture image 108 is W×H [pixels], and the coordinates of the selected processing target pixel are $(I_k, J_k)$, the coordinates $(i_k, j_k)$ of the position on the sample texture image 107 corresponding to the selected processing target pixel is given by the following equations:

$$i_k = I_k \times \frac{w}{W}, \quad (15)$$

$$j_k = J_k \times \frac{h}{H}$$

The above-mentioned search range on the sample texture image 107 is set as a small region that includes the coordinates $(i_k, j_k)$ as its center and has a size of from approx. 20×20 [pixels] to approx. 40×40 [pixels].

To execute enlargement from the sample texture image 107 to the texture image 108 of high resolution, if generally used simple enlarging processing, such as bilinear interpolation or bicubic interpolation, is used, high-frequency texture component information will be lost and hence high-definition images cannot be obtained. To avoid such a problem of interpolation for enlargement, the first embodiment employs, as a method of generating the texture image 108 from the sample texture image 107, a texture generation method proposed in the CG field, which will now be described in detail.

Figure 5:
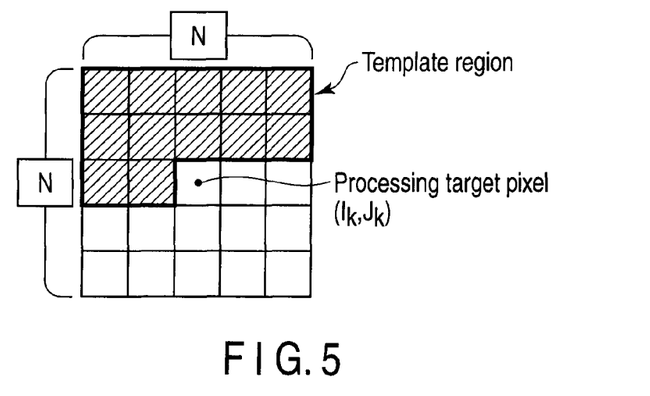
FIG. 5 is a view illustrating a template region used for generating a texture image.
Figure 6:
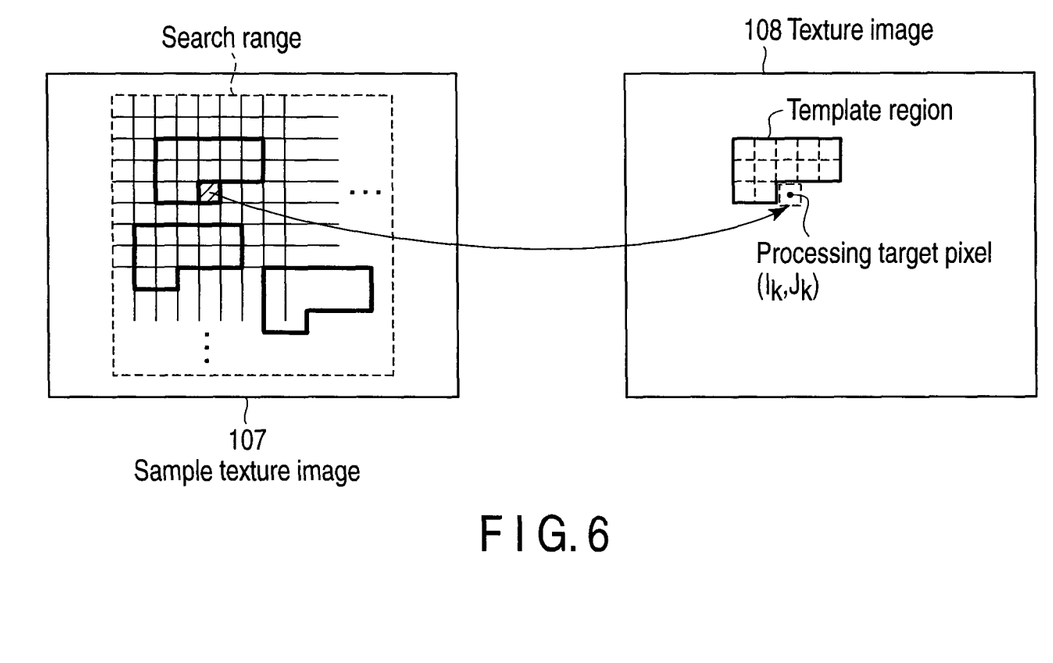
FIG. 6 is a view illustrating the generated texture image.

FIGS. 5 and 6 are views useful in explaining the method of generating the texture image 108.

The processing target pixel (having the coordinates $(I_k, J_k)$) in the texture image 108 is sequentially shifted from the upper left pixel to the lower right pixel. As shown in FIG. 5, a region, which is included in a region (N×N [pixels]) including the processing target pixel (having the coordinates $(I_k, J_k)$) and to which pixel values are already assigned, is set as a template region.

As shown in FIG. 6, a region included in the search range and having a pixel-value variation pattern most similar to that of the template region is searched for. The luminance value of a pixel (i.e., the hatched pixel in FIG. 6), which is located near the region having the most similar pixel-value variation pattern and corresponds to the position in the template region indicated by the coordinates $(I_k, J_k)$, is assigned to the position $(I_k, J_k)$. When searching the search range for the region most similar to the template region, the region, in which the sum of squares of errors in the pixels is minimum, is selected as the most similar region, for example.

At step S205, it is determined whether the pixel values of all pixels of the texture image 108 have been set. If all pixel values are not yet set, the program proceeds to step S204, whereas if all pixel values have been set, the program proceeds to step S206.

At step S206, the base image 105 and the texture image 108 are combined to form the synthetic image 110. The image combining unit 104 performs an operation that depends upon the operation executed at step S203 by the sample texture image generating unit 101. If the sample texture image generating unit 101 employs an addition-type separation method, such as an addition-type skeleton/texture separation method or the ε-filter, the synthetic image 110 is acquired using equation (16) recited below. On the other hand, if the sample texture image generating unit 101 employs a multiplication-type separation method, such as a multiplication-type skeleton/texture separation method or the Center/Surround Retinex method, the synthetic image 110 is acquired using the following equation (17).

Synthetic image 110=Base Image 105+Texture Image 108     (16)

Synthetic image 110=Base Image 105×Texture Image 108     (17)

At step S207, the synthetic image 110 is output, which is the termination of the entire process.

In the first embodiment, if an image that holds the shades of the transform target image 106 is used as the base image 105, the shades can be maintained. Further, since the sample texture image 107 that contains the local orientation information of the transform target image 106 is used to generate the texture image 108, a high-frequency texture component can be generated which reflects the features of the textures and holds the shades of the transform target image 106 and the orientations of the textures of the same. As a result, the feel of the material of the transform target image 106 can be enhanced.

Second Embodiment

A second embodiment differs from the first embodiment in that in the former, a reduced-image sample texture image obtained by reducing the transform target image 106 is used.

Figure 7:
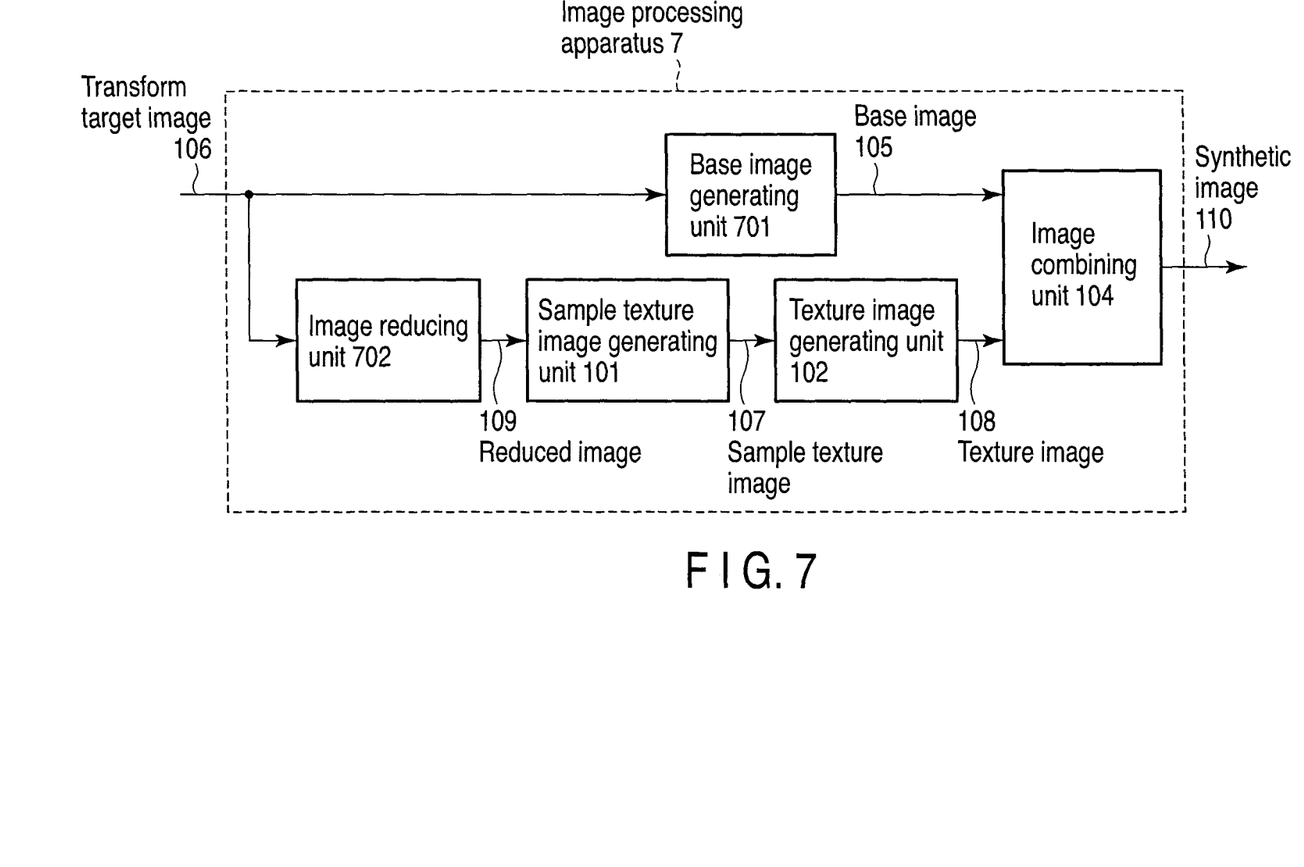
FIG. 7 is a block diagram illustrating an image processing apparatus according to a second embodiment.

FIG. 7 is a block diagram illustrating an image processing apparatus 7 according to a second embodiment. The image processing apparatus 7 differs from the image processing apparatus 1 of FIG. 1 in that the former further comprises a base image generation unit 701 and an image reduction unit 702.

The base image generation unit 701 generates, as the base image 105, an image formed by eliminating a texture component from the transform target image 106, or the transform target image 106 itself.

The image reduction unit 702 reduces the transform target image 106 to form a reduced image 109.

The sample texture image generating unit 101 eliminates shades from the reduced image 109 to generate the sample texture image 107.

Figure 8:
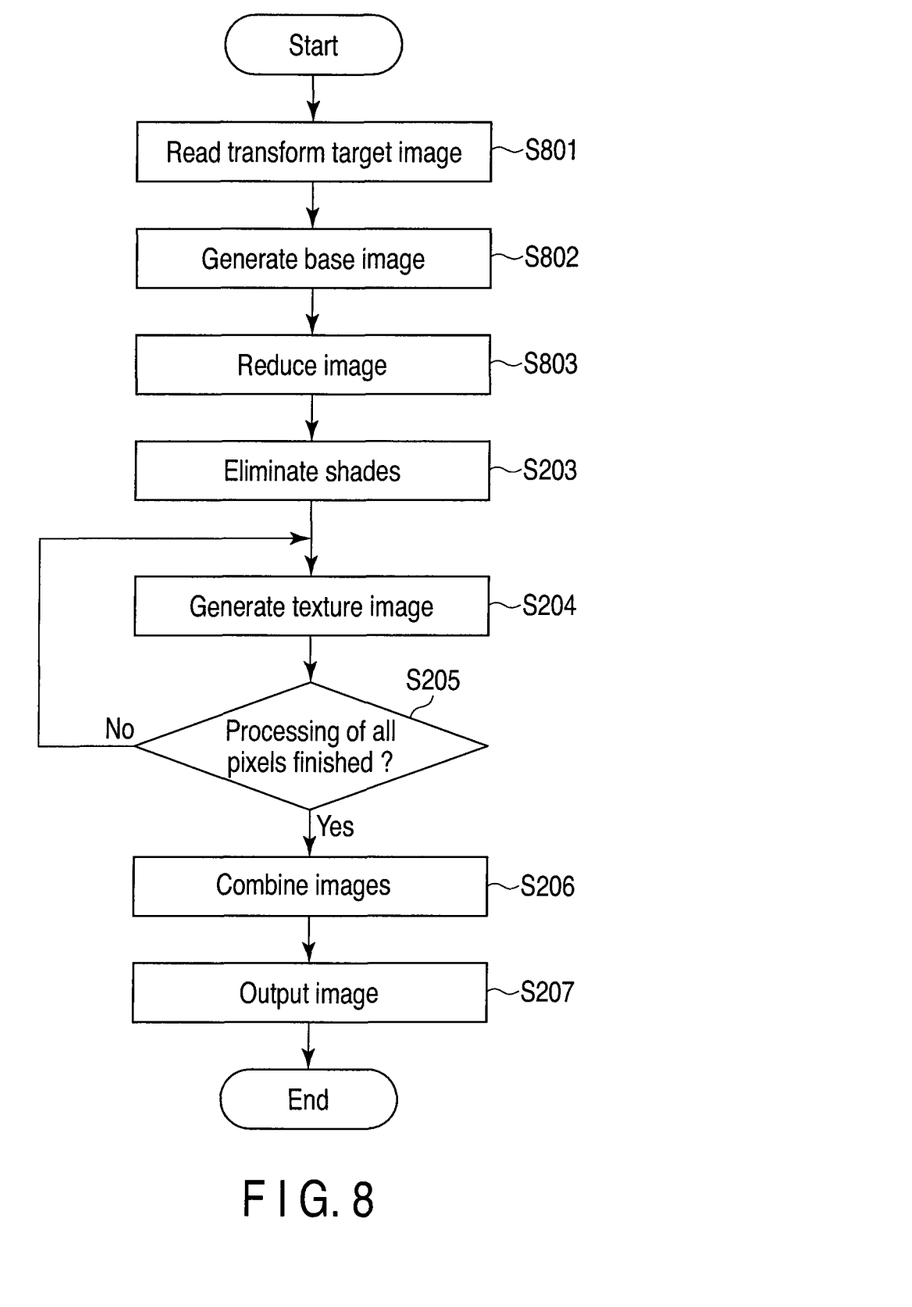
FIG. 8 is a flowchart useful in explaining the operation of the image processing apparatus of the second embodiment.

FIG. 8 is a flowchart useful in explaining the operation of the image processing apparatus 7. Steps S203 to S207 in FIG. 8 are similar to those in FIG. 2, therefore no description is given thereof.

At step S801, the transform target image 106 is read in.

At step S802, the base image 105 is generated from the transform target image 106. The base image 105 may be the transform target image 106 itself, or be an image formed by eliminating a texture component from the transform target image 106. To eliminate the texture component from the transform target image 106, the skeleton/texture separation method, the Center/Surround Retinex method, or the ϵ-filter is used. In any case, the base image 105 holds shades similar to those of the transform target image 106.

At step S803, the transform target image 106 is reduced to form the reduced image 109. In the case of an image containing a certain texture pattern component, the texture pattern component having a frequency 1/K the frequency of the original pattern can be generated by multiplying the image by K. K is an arbitrary real number that satisfies 0<K<1.0.

The image processing apparatus 7 of the second embodiment can generate the synthetic image 110 having a texture component that is similar in texture pattern to the texture component of in the transform target image 106 but has a higher frequency, thereby enhancing the delicacy of the textures of the transform target image 106.

Third Embodiment

A third embodiment differs from the image processing apparatus 1 of FIG. 1 in that in the former, a base image is generated from an enlarged transform target image.

Figure 9:
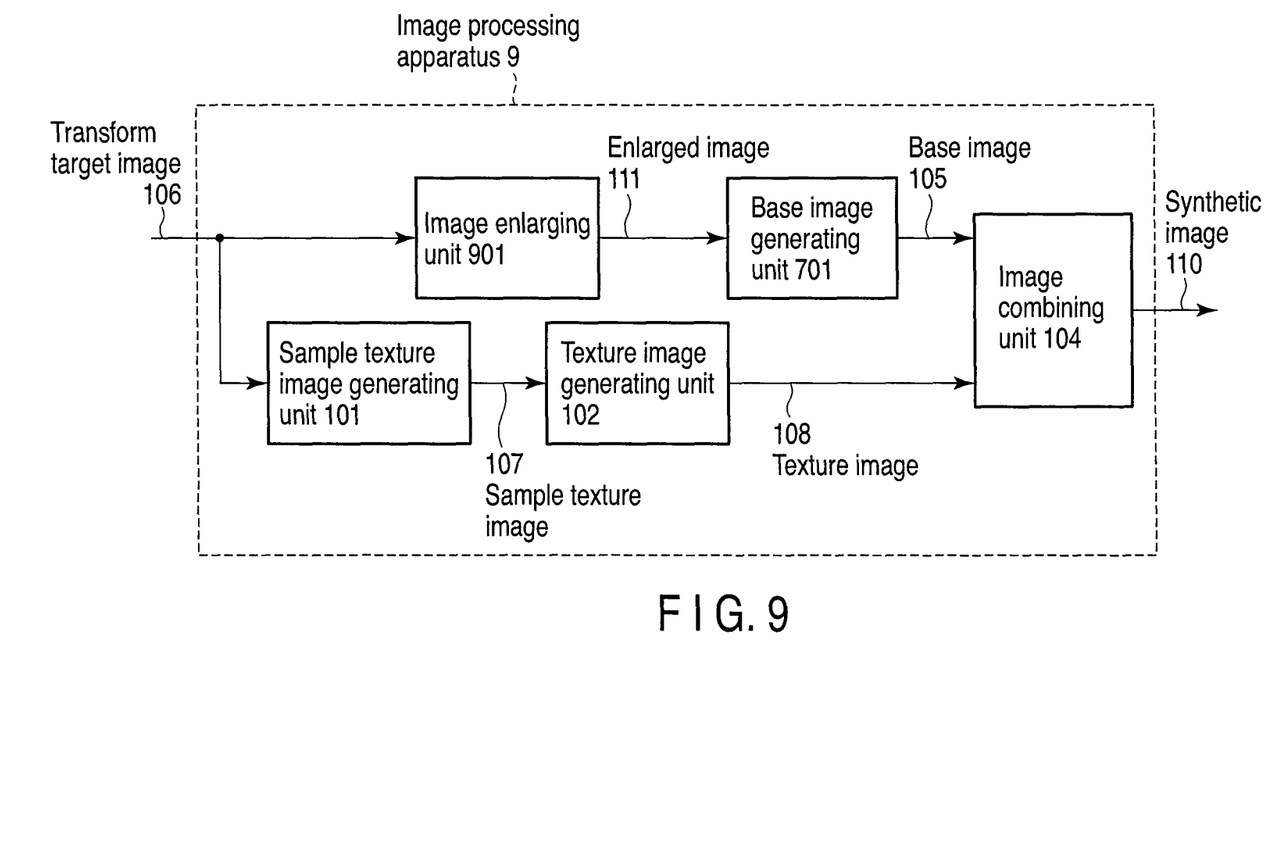
FIG. 9 is a block diagram illustrating an image processing apparatus according to a third embodiment.

FIG. 9 is a block diagram illustrating an image processing apparatus 9 of the third embodiment. The image processing apparatus 9 differs from the image processing apparatus 1 in that the former further comprises a base image generating unit 701 and an image enlarging unit 901.

The image enlarging unit 901 enlarges the transform target image 106 to form an enlarged image 111.

The base image generating unit 701 generates, as the base image 105, an image obtained by eliminating a texture component from the enlarged image 111, or the enlarged image 111 itself.

Figure 10:
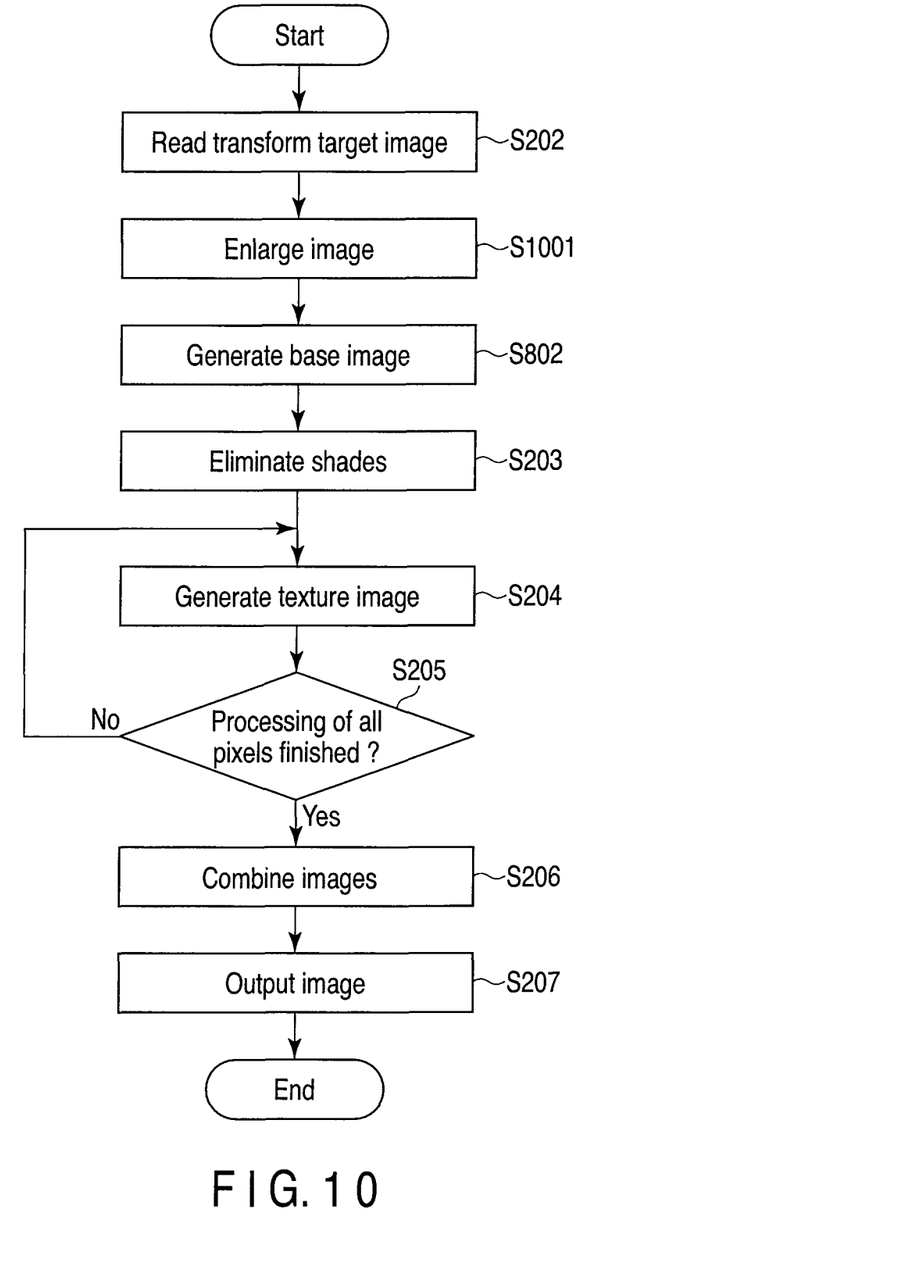
FIG. 10 is a flowchart useful in explaining the operation of the image processing apparatus of the third embodiment.

FIG. 10 is a flowchart useful in explaining the operation of the image processing apparatus 9 of the third embodiment. Steps S202, S802, S203 and S205 to S208 are similar to those of FIGS. 2 and 8 At step S1001, the enlarged image 111 of the transform target image 106 is generated. An arbitrary image enlarging method may be employed to enlarge images. For instance, a nearest neighbor method, a linear interpolation method, a cubic convolution method (bicubic interpolation method), and so on, can be used to interpolate pixel values to enlarge images. To prevent degradation of image quality, it is desirable to use an image enlarging method capable of generating least blurred images.

The image processing apparatus of the third embodiment can impart, to an enlarged image, a pattern similar to the high-frequency texture component pattern contained in a transform target image. Since the texture component contained in the transform target image has a higher frequency than the texture component of the enlarged image, the delicacy of the textures in the enlarged image are enhanced.

Fourth Embodiment

In a fourth embodiment, an image obtained by a sharpening process, and a texture image are combined.

Figure 11:
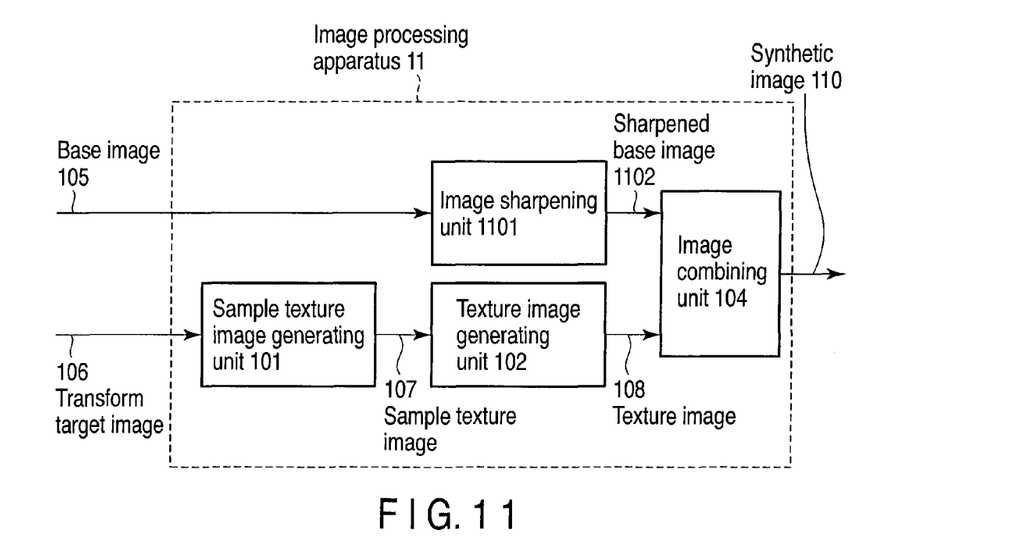
FIG. 11 is a block diagram illustrating an image processing apparatus according to a fourth embodiment.

FIG. 11 is a block diagram illustrating an image processing apparatus 11 according to the fourth embodiment. The image processing apparatus 11 differs from the structure of FIG. 1 in that the former further comprises an image sharpening unit 1101 for generating a sharpened base image 1102.

The image sharpening unit 1101 sharpens a base image 105 to form the sharpened base image 1102.

The image combining unit 104 combines the sharpened base image 1102 and a texture image 108 to form a synthetic image 110. The output of the image processing apparatus 11 is this synthetic image 110.

Figure 12:
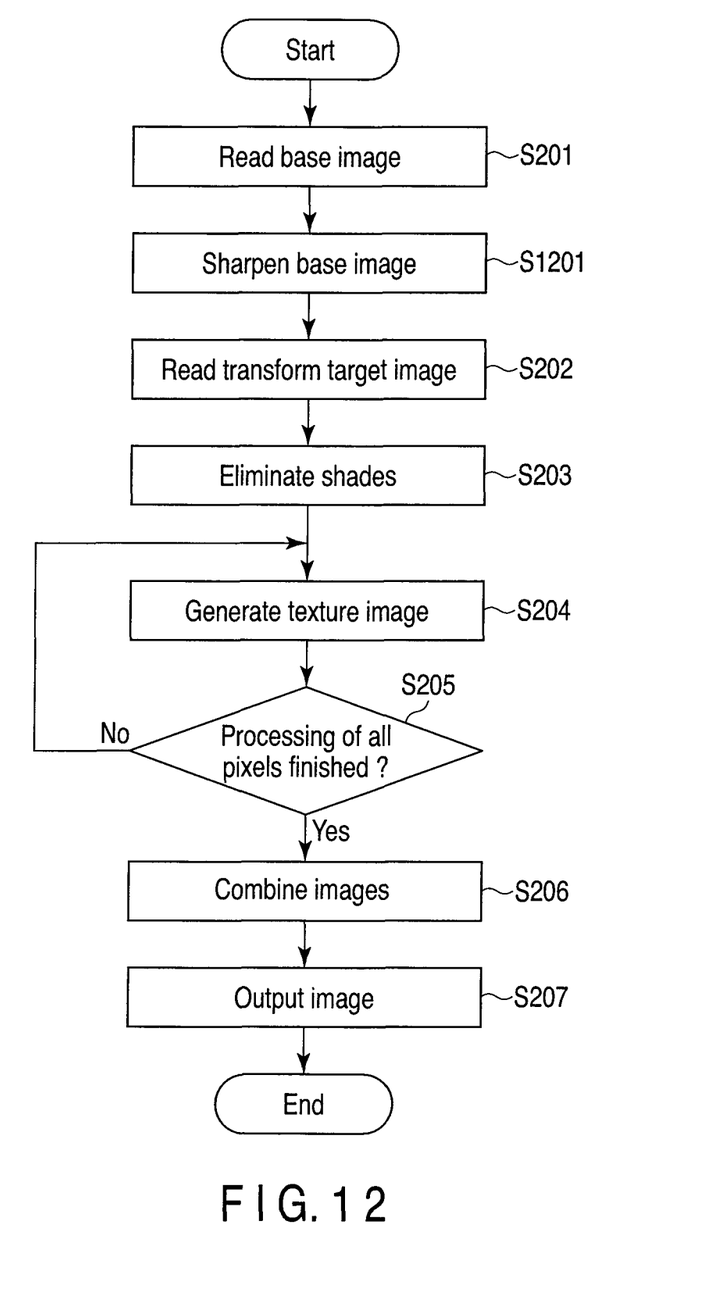
FIG. 12 is a flowchart useful in explaining the operation of the image processing apparatus of the fourth embodiment.

Referring now to FIGS. 11 and 12, the operation of the image processing apparatus 11 of the fourth embodiment will be described. FIG. 12 is a flowchart useful in explaining the operation of the image processing apparatus 11.

At step S1201, the base image 105 is sharpened into the sharpened base image 1102. For this process, an arbitrary sharpening method can be used. For instance, unsharp masking may be used.

In the image processing apparatus of the fourth embodiment, the edges and textures contained in the base image can be sharpened to enhance the sharpness of the textures of the synthetic image.

Fifth Embodiment

A fifth embodiment differs from the above-described embodiments in that in the former, the sample texture image is formed of an image obtained by attenuating the amplitude of the texture component of an image that is obtained by eliminating shades from a transform target image.

Figure 13:
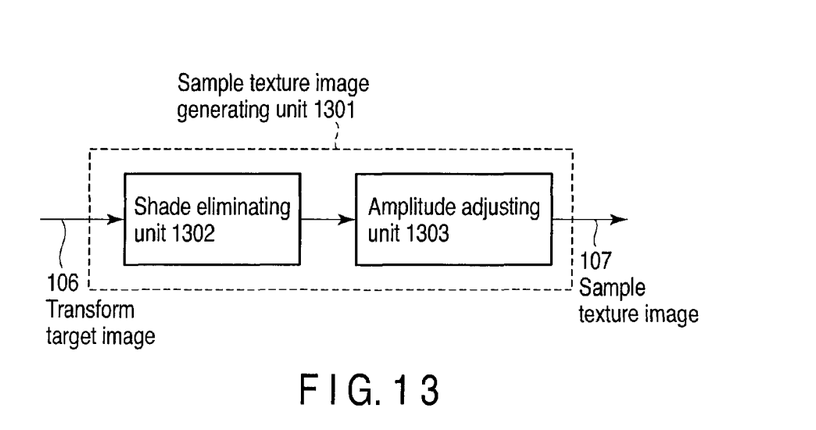
FIG. 13 is a block diagram illustrating an image processing apparatus according to a fifth embodiment.

FIG. 13 is a block diagram illustrating a sample texture image generating unit 1301 employed in the fifth embodiment.

The sample texture image generating unit 1301 comprises a shade eliminating unit 1302 and an amplitude adjusting unit 1303.

The shade eliminating unit 1302 eliminates shades from the transform target image 106 like the sample texture image generating unit 101 in the first to fourth embodiments.

The amplitude adjusting unit 1303 attenuates the luminance amplitude of the output of the shade eliminating unit 1302 to adjust the amplitude and generate the sample texture image 107.

Figure 14:
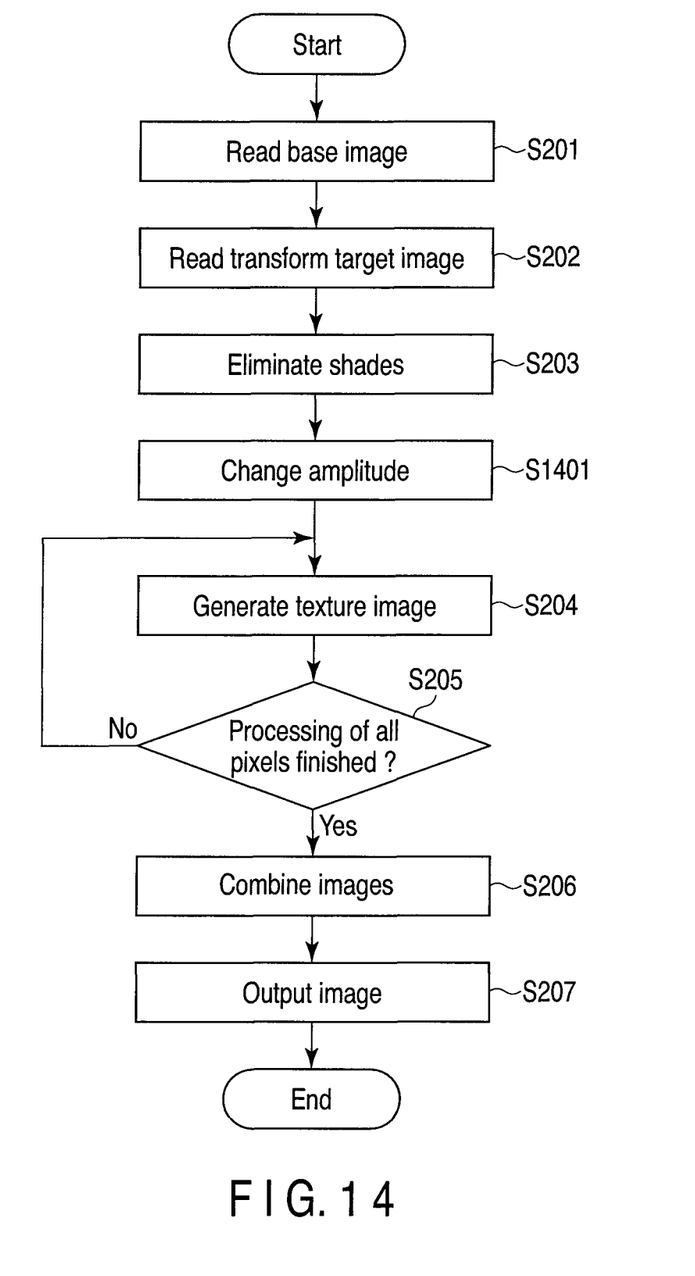
FIG. 14 is a flowchart useful in explaining the operation of the image processing apparatus of the fifth embodiment.

FIG. 14 is a flowchart useful in explaining the operation of the image processing apparatus of the fifth embodiment. Steps S201 to S208 are similar to those of FIG. 2, therefore will not be described.

At step S1401, the luminance amplitude of the output of the shade eliminating unit 1302 is attenuated and adjusted to form the sample texture image 107. The attenuation of the luminance amplitude is executed using equation (19) or (20) recited below. If the shade eliminating unit 1302 employs an addition type separation method such as an addition-type skeleton/texture separation method or the ϵ-filter, it uses the equation (19).

In contrast, if the shade eliminating unit 1302 employs a multiplication-type separation method such as a multiplication-type skeleton/texture separation method or the Center/Surround Retinex method, it uses the equation (20).

$$V'(x,y) = V(x,y)^a \quad (19)$$

$$V'(x,y) = a \cdot V(x,y) \quad (20)$$

where V is the pixel value of each pixel of the image output from the shade eliminating unit 1302, V' is the pixel value of each pixel of the sample texture image obtained after the amplitude adjustment, and a is an amplitude adjusting coefficient, which is, for example, 0.5 when attenuating the amplitude to ½.

The adjusting coefficient a may be set arbitrarily. Alternatively, it may be automatically set based on the size ratio of the transform target image 106 to the base image 105. When automatically setting the adjusting coefficient, the following equations (21) are used:

$$a = W_{V'}/W_V \text{ or } a = H_{V'}/H_V \quad (21)$$

where $W_V$ [pixels] and $H_V$ [pixels] are the width and length of the transform target image 106, and $W_{V'}$ [pixels] and $H_{V'}$ [pixels] are the width and length of the base image 105.

In the image processing apparatus of the fifth embodiment, the amplitude of the texture component of a texture image to be combined with a base image can be made to be different from the amplitude of the texture component of a transform target image. This enables a synthetic image with textures different in impression from those of the transform target image to be formed even when the texture image and the transform target image have texture components of the same frequency.

The image processing apparatus according to each of the above-described embodiments can be realized using, for example, a versatile computer as basic hardware. The program to be executed has a module structure including each of the above-described functions. The program may be of an installable-format file or an executable-format file that may be recorded on a computer-readable recording medium, such as a CD-ROM, CD-R, DVD, etc., or may be beforehand stored in, for example, a ROM.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising a computer, the computer programmed to:
   generate a sample texture image having a texture component by extracting the texture component from a transform target image;
   generate a texture image including first pixels to each of which a pixel value is not yet assigned and second pixels to which pixel values are assigned, the texture image having a size greater than a size of the sample texture image;
   select one of the first pixels as a processing target pixel;
   determine a preset search range within the sample texture image, the preset search range including a first location corresponding to a second location of the processing target pixel;
   search for a third pixel in the preset search range, a value calculated based on differences between pixels around the third pixel and the second pixels located around the processing target pixel being less than a threshold; and
   assign a pixel value of the third pixel to the processing target pixel.

2. The apparatus according to claim 1, wherein the computer is further programmed to search the search range for the third pixel, a first pixel value variation pattern of pixels located around the third pixel and included in a region of the sample texture image having a same shape as a template region having a highest similarity with respect to a second pixel value variation pattern of pixels included in the template region, a group of pixels which are included in the texture image and located near the processing target pixel and to which pixel values are already assigned being set as the template region.

3. The apparatus according to claim 2, wherein the computer is further programmed to compute the highest similarity based on a difference between a first pixel value of each of the pixels included in a region of the same shape as the template region, and a second pixel value of each of the pixels which are included in the template region and to which pixel values are already assigned.

4. The apparatus according to claim 3, wherein the computer is further programmed to generate a base image by eliminating the texture component from the transform target image.

5. The apparatus according to claim 4, wherein the computer is further programmed to: reduce the transform target image into a reduced image; and eliminate shades from the reduced image to generate the sample texture image.

6. The apparatus according to claim 4, wherein the computer is further programmed to: enlarge the transform target image into an enlarged image; and eliminate a texture component from the enlarged image to generate the base image.

7. The apparatus according to claim 4, wherein the computer is further programmed to:
sharpen the base image into a sharpened base image; and
combine the texture image and a base image of a same size as the texture image to obtain a synthetic image, the base image holding shades similar to shades of the transform target image, and combine the sharpened base image and the texture image to generate the synthetic image.

8. The apparatus according to claim 4, wherein the computer is further programmed to:
eliminate shades from the transform target image to form a shade eliminated image; and
change an amplitude corresponding to each pixel value of the shade eliminated image.

9. An image processing method comprising:
generating a sample texture image having a texture component by extracting the texture component from a transform target image;
generating a texture image including first pixels to each of which any pixel value is not yet assigned and second pixels to which pixel values are assigned, the texture image having a size greater than a size of the sample texture image;
selecting one of the first pixels as a processing target pixel,
determining a preset search range within the sample texture image, the preset search range including a first location corresponding to a second location of the processing target pixel;
searching for a third pixel in the preset search range, a value calculated based on differences between pixels around the third pixel and the second pixels located around the processing target pixel being less than a threshold; and
assigning a pixel value of the third pixel to the processing target pixel.

10. The apparatus according to claim 1, wherein the computer is further programmed to combine the texture image and a base image of a same size as the texture image to obtain a synthetic image, the base image holding shades similar to shades of the transform target image.

11. The method according to claim 9, further comprising combining the texture image and a base image of a same size as the texture image to obtain a synthetic image, the base image holding shades similar to shades of the transform target image.

* * * * *